(12) United States Patent
Eschenbach

(10) Patent No.: US 7,494,447 B2
(45) Date of Patent: Feb. 24, 2009

(54) ELLIPTICAL EXERCISE APPARATUS WITH ADJUSTABLE CRANK

(76) Inventor: Paul William Eschenbach, 290 S. Tyger La., Roebuck, SC (US) 29376

( * ) Notice: Subject to any disclaimer, the term of this patent is extended or adjusted under 35 U.S.C. 154(b) by 743 days.

(21) Appl. No.: 11/105,300

(22) Filed: Apr. 14, 2005

(65) Prior Publication Data
US 2005/0181912 A1 Aug. 18, 2005

Related U.S. Application Data

(63) Continuation-in-part of application No. 10/973,597, filed on Oct. 27, 2004, which is a continuation-in-part of application No. 10/303,938, filed on Nov. 26, 2002, now Pat. No. 6,830,538.

(51) Int. Cl.
*A63B 22/04* (2006.01)
(52) U.S. Cl. .......................... 482/52; 482/79
(58) Field of Classification Search .................. 482/51, 482/52, 57, 62, 79, 80
See application file for complete search history.

(56) References Cited

U.S. PATENT DOCUMENTS

| D330,236 | S | 10/1992 | Jarriel et al. | D21/194 |
|---|---|---|---|---|
| 5,279,529 | A | 1/1994 | Eschenbach | 482/57 |
| 5,387,167 | A | 2/1995 | Johnson | 482/57 |
| 5,529,555 | A | 6/1996 | Rodgers | 482/57 |
| 5,792,028 | A | 8/1998 | Jarvie | 482/57 |
| 5,902,216 | A | 5/1999 | Lee | 482/57 |
| 5,957,814 | A | 9/1999 | Eschenbach | 482/51 |
| 6,019,710 | A | 2/2000 | Dalebout et al. | 482/70 |
| 6,024,676 | A | 2/2000 | Eschenbach | 482/51 |
| 6,042,512 | A | 3/2000 | Eschenbach | 482/51 |
| 6,146,314 | A | 11/2000 | Lee | 482/57 |
| 6,217,486 | B1 | 4/2001 | Rosenow | 482/52 |
| 6,238,321 | B1 | 5/2001 | Arnold et al. | 482/52 |
| 6,361,476 | B1 | 3/2002 | Eschenbach | 482/52 |
| 6,755,769 | B2 | 6/2004 | Johnson | 482/57 |
| 7,214,168 | B2 * | 5/2007 | Rodgers, Jr. | 482/52 |
| 7,361,122 | B2 * | 4/2008 | Porth | 482/52 |
| 2006/0172865 | A1 * | 8/2006 | Dey et al. | 482/52 |

* cited by examiner

*Primary Examiner*—Loan H Thanh
*Assistant Examiner*—Tam Nguyen

(57) ABSTRACT

The present invention relates to a standup exercise apparatus that simulates walking, jogging and climbing with arm exercise. More particularly, the present invention relates to an exercise machine having separately supported pedals for the feet and arm exercise coordinated with the motion of the feet. Elliptical cross trainers guide the feet along a generally elliptical shaped curve to simulate the motions of jogging and climbing. Existing elliptical cross trainers often use excessive pedal articulation which can overwork the ankle to achieve a longer stride. The present invention is an improved elliptical exercise machine capable of extended exercise with less pedal articulation that is more ankle friendly. One end of a foot support member has a pedal following elliptical motion while the other end is guided by an orbital link to drive an alternator and flywheel. The resulting pedal motion is foot friendly. Stride length can be adjusted. Handles are coordinated with the foot support members for arm exercise.

18 Claims, 4 Drawing Sheets

ELLIPTICAL EXERCISE APPARATUS WITH ADJUSTABLE CRANK

This application is a Continuation-in-Part of previous application Ser. No. 10/973,597 filed Oct. 27, 2004 which is a Continuation-in-Part of Ser. No. 10/303,938, filed Nov. 26, 2002, now U.S. Pat. No. 6,830,538.

BACKGROUND OF THE INVENTION

1. Field

The present invention relates to a standup exercise apparatus that simulates walking, jogging and climbing with arm exercise. More particularly, the present invention relates to an exercise machine having separately supported pedals for the feet and arm exercise coordinated with the motion of the feet. The pedal lift is controlled separately and can be varied.

2. State of the Art

The benefits of regular exercise to improve overall health, appearance and longevity are well documented in the literature. For exercise enthusiasts the search continues for safe apparatus that provides full body exercise for maximum benefit in minimum time.

Recently, a new category of exercise equipment has appeared on the commercial market called elliptical cross trainers. These cross trainers guide the feet along a generally elliptical shaped curve to simulate the motions of jogging and climbing. Generally they are large exercise machines having long cranks which causes the pedals to have excessive articulation producing ankle stress. There is a need for a more compact elliptical exercise machine with favorable pedal articulation and arm exercise. Further, there is a need to adjust the elliptical motion to vary the stride, lift and amount of climb desired by the operator during operation.

Standup pedal exercise combined with arm levers attached to the pedals is shown in Kummerlin et al. German Pat. No. 2,919,494 and in Geschwender U.S. Pat. No. 4,786,050. Standup pedal exercise coupled with oscillating swing arms is shown in Miller U.S. Pat. Nos. 5,242,343 and 5,383,829 and in Eschenbach U.S. Pat. No. 5,423,729. All of these exercise machines use pedals having two pedal pivots which are guided by a first circular guide path curve generated by a crank which rotates through one full revolution during a pedal cycle and a second arc guide path curve generated by a rocker link or track.

Eschenbach in U.S. Pat. No. 5,957,814 shows the use of an orbital link in a front drive elliptical design using a single crank. Dalebout et al. in U.S. Pat. No. 6,019,710 shows a front drive elliptical device having rollers under the pedals. Several rear drive elliptical cross trainers are shown by Eschenbach in U.S. Pat. Nos. 6,042,512 and 6,361,476. Rosenow in U.S. Pat. No. 6,217,486 and Arnold et al. in U.S. Pat. No. 6,238,321 shown typical commercial rear drive elliptical cross trainers in use today.

Jarriel et al. in U.S. Des. Pat. No. 330,236 shows a pair of equal length cranks that guide a pedal for standup exercise. Eschenbach in U.S. Pat. No. 5,279,529 shows a double crank configuration to guide a pedal where each crank is a different length. Johnson in U.S. Pat. Nos. 5,387,167, 5,403,255, 5,647,821, 5,944,636, 6,120,417, 6,251,050, 6,746,377 and 6,755,769 displays pedals guided by two cranks of the same length and different lengths.

Lee in U.S. Pat. Nos. 5,902,216 and 6,146,314 shows a pair of unequal cranks to guide a pedal with arm exercise added. Jarvie in U.S. Pat. No. 5,792,028 also shows a pair of cranks with a linkage for striding. Rodgers in U.S. Pat. No. 5,529,555 shows a linkage with two cranks to generate an ellipse.

There is a need for a pedal operated exercise machine that can be safely operated in the standup position whereby the arms and legs can be exercised with the feet moving through a generally elliptical path without excessive pedal articulation. There is a further need to have the elliptical pedal path adjustable.

It is one objective of this invention to provide an elliptical pedal movement with a double crank linkage that reduces the steep pedal angles which can occur with a simple crank. Another object of this invention is to provide arm exercise that is coordinated with the pedal movement. Yet another objective of this invention is to provide a pedal path that may adjusted during operation of the apparatus.

SUMMARY OF THE INVENTION

The present invention relates to the kinematic motion control of pedals which simulate walking, jogging and climbing during operation. More particularly, apparatus is provided that offers variable intensity exercise through a leg operated cyclic motion in which the pedal supporting each foot is guided through successive positions during the motion cycle while a load resistance acts upon the mechanism.

The pedals are guided through an oblong or elongate curve motion while pedal angles are controlled to vary about the horizontal during the pedal cycle. Arm exercise is by arm handles coordinated with the foot pedals.

In the preferred embodiment, the apparatus includes a separate pedal for each foot, each pedal is supported by a foot support member on one end and is pivotally attached on the other end to an orbital link. A first crank is pivotally connected to the orbital link proximate one end and rotatably attached to the framework. A connector link is pivotally connected to the orbital link intermediate the ends. A second crank is pivotally connected to the connector link and is rotatably attached to the framework. Each crank completes one full revolution during a pedal cycle and is phased generally opposite the crank for the other foot support member through a bearing journal attached to the framework. All portions of the orbital link follow orbital paths. Both cranks rotate at the same speed.

A roller is positioned intermediate the ends of the foot support member and makes rollable contact with a guide member. The guide member is pivotally connected to the framework. At one end of the guide member, an actuator or other means for securing the guide member is pivotally connected to one end to raise and lower the guide member.

The guide member can be repositioned manually or by actuator. In the case of a manual adjustment means, the guide member may be lifted to reposition a guide arm. The actuator with a suitable control system can be electrically operated with linear movement or other arrangement intended to reposition the guide member during operation to select a different pedal lift.

A pair of handles for arm exercise are pivotally connected to the framework. A pair of handle links couple the handles to the orbital link. It is understood that the handles for arm exercise could be coupled to other components of this apparatus by another means and remain within the scope of the present invention.

Load resistance is applied to the crank by a pulley which drives a belt to a smaller pulley attached to a flywheel supported by the framework. An adjustable friction belt engages the circumference to provide the load. Alternately, other means of load resistance may be used such as an alternator. Adjustment of the alternator control electronics provides variable intensity exercise for the operator.

Either crank can be made adjustable using an actuator to change the crank length during operation of the apparatus. A change of crank length in the first crank causes the pedal curve to change both stride and lift. A change of crank length in the second crank causes a stride change in the pedal curve. The actuator would be controlled by the control system.

In summary, this invention provides the operator with stable foot pedal support having adjustable pedal curve during operation that simulate walking, jogging and climbing with very low joint impact and coordinated upper body exercise. The handles for arm exercise remain in coordination with adjustments made to the foot pedal motion.

DETAILED DESCRIPTION OF THE EMBODIMENTS

Figure 1:
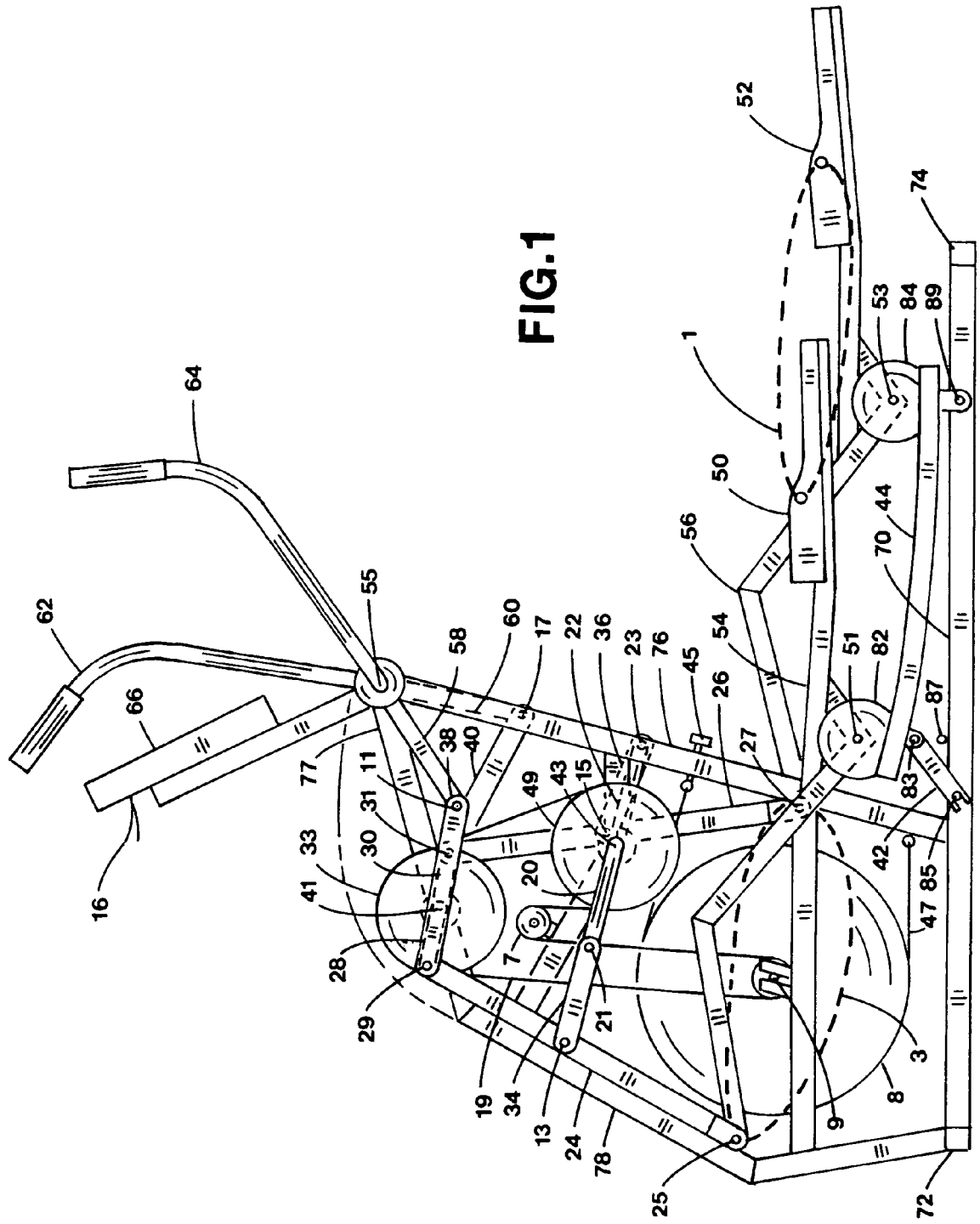
FIG. 1 is a right side elevation view of the preferred embodiment of the exercise machine constructed in accordance with the present invention.
Figure 2:
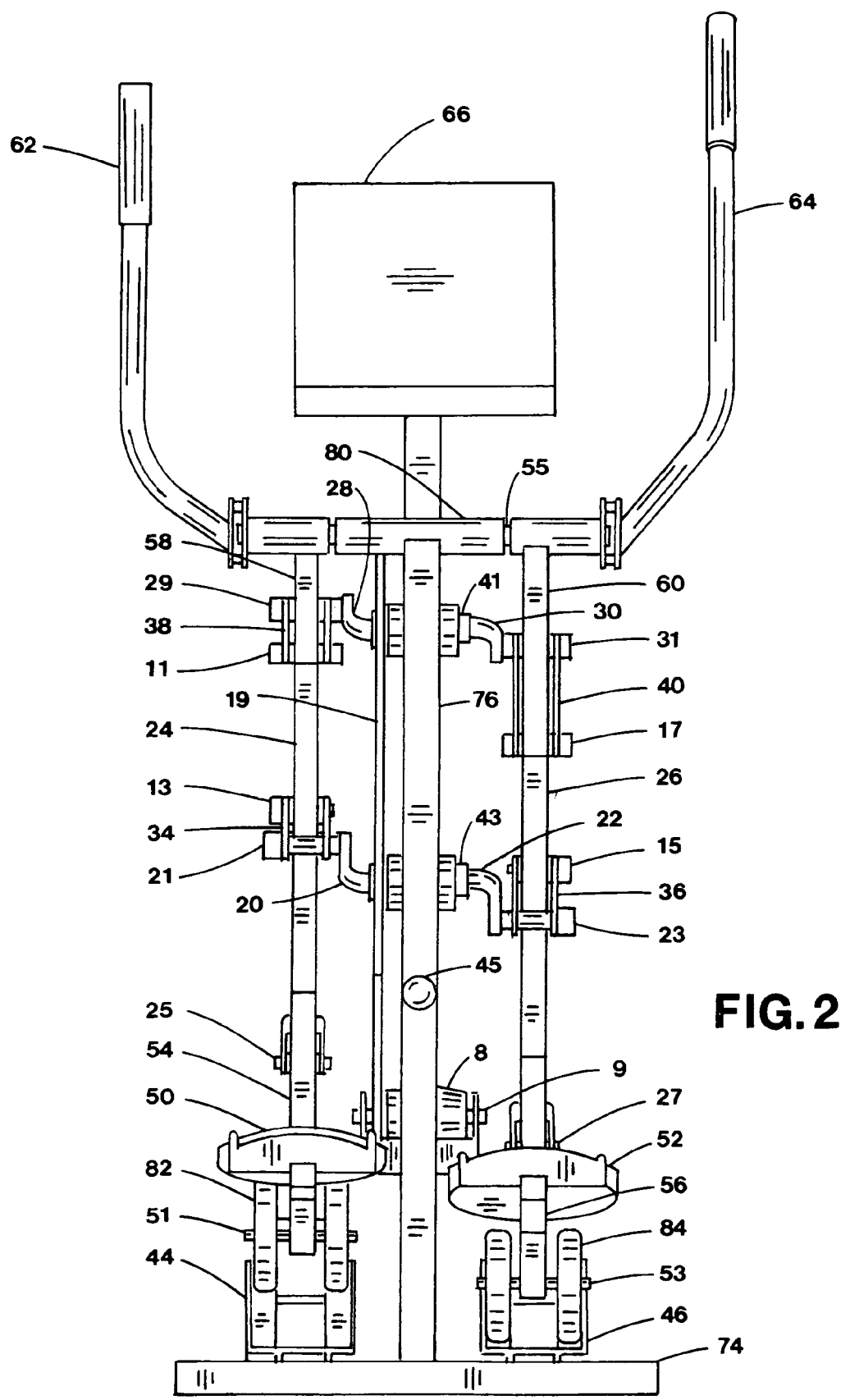
FIG. 2 is the rear view of the preferred embodiment shown in FIG. 1.

Referring to the drawings in detail, pedals 50 and 52 are shown in FIGS. 1 and 2 in the most forward and rearward positions of the preferred embodiment. Pedals 50 and 52 are attached to foot support members 54,56 at one end. The other end of foot support members 54,56 are connected to orbital links 24,26 at pivots 25,27 which follow an elongate orbital path 3. First crank arms 28,30 are pivotally connected to the orbital links 24,26 at pivots 29,31 and rotatably attached to frame member 77 at crank axis 41 protruding outwardly in generally opposing directions to comprise a crank having crank pivot 41.

Connector links 34,36 are pivotally connected to the orbital links 24,26 at pivots 13,15. Second crank arms 20,22 are pivotally connected to connector links 34,36 at pivots 21,23 and rotatably attached to the framework at pivot axis 43. First crank arms 28,30 and second crank arms 20,22 are configured to rotate at the same speed by pulleys 33,49 having the same diameter engaged with belt 19. As the crank arms 20,22,28,30 rotate, the orbital links 24,26 cause pivots 25,27 to follow elongate path 3.

Rollers 82,84 are rotatably attached to the foot support members 54,56 intermediate the ends at pivots 51,53. Guide members 44,46 are pivotally attached to frame member 70 at pivot 89. Rollers 82,84 are in rollable contact with guide members 44,46. Guide arms 42 are connected to guide members 44,46 at pivot 83 and are secured to frame member 70 by pin 85. To change the position of guide members 44,46, guide arms 42 may be repositioned manually to pin 87 on frame member 70 or by actuator (not shown) via control system 66.

Handles 62,64 for arm exercise are pivotally attached to frame member 80 at pivot 55 and extend downward as handle extensions 58,60. Handle links 38,40 are pivotally connected to handle extensions 58,60 at pivots 11,17 and to orbital links 24,26 at pivots 29,31.

Frame members 70 connect cross members 72,74 which contact the floor for support of the exercise machine. Frame members 76,78 are connected by frame member 77 and attach to frame members 70. Load resistance is imposed upon crank arms 20,22 and 28,30 by pulleys 33,49,7 and belt 19 which drives flywheel 8 about pivot 9. Friction belt 47 encompasses flywheel 8 with adjustable tension supplied by adjustment knob 45. An actuator (not shown) attached to friction belt 47 and a control system 66 through wires 16 could also be used for variable intensity exercise. Other forms of load resistance may also be used.

Application of body weight on the pedals 50,52 causes the pedals 50,52 to follow elliptical stride curve 1 shown in FIG. 1 and together with force applied at the arm handles 62,64 cause the linkages 24,34,20,28 and 26,36,22,30 to rotate the flywheel 8 for a gain in momentum. This flywheel 8 momentum will carry the linkage system through any dead center positions of the cranks 20,22 and 28,30. The pedals 50,52 and arm handles 62,64 can be operated to drive the flywheel 8 in either direction of rotation.

Figure 3:
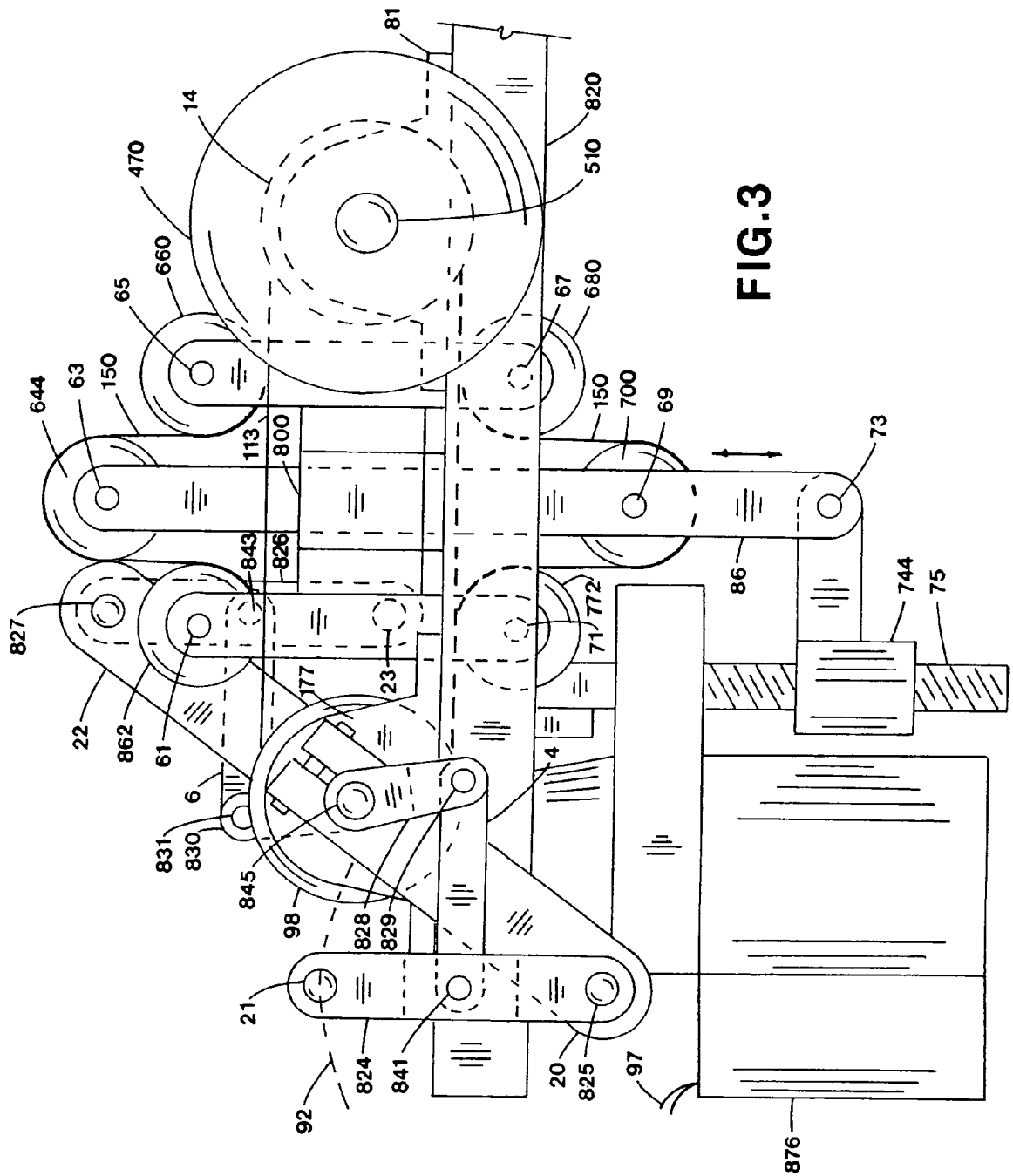
FIG. 3 is a right side elevation view of the adjustable crank that can be used with the preferred embodiment shown in FIG. 1.
Figure 4:
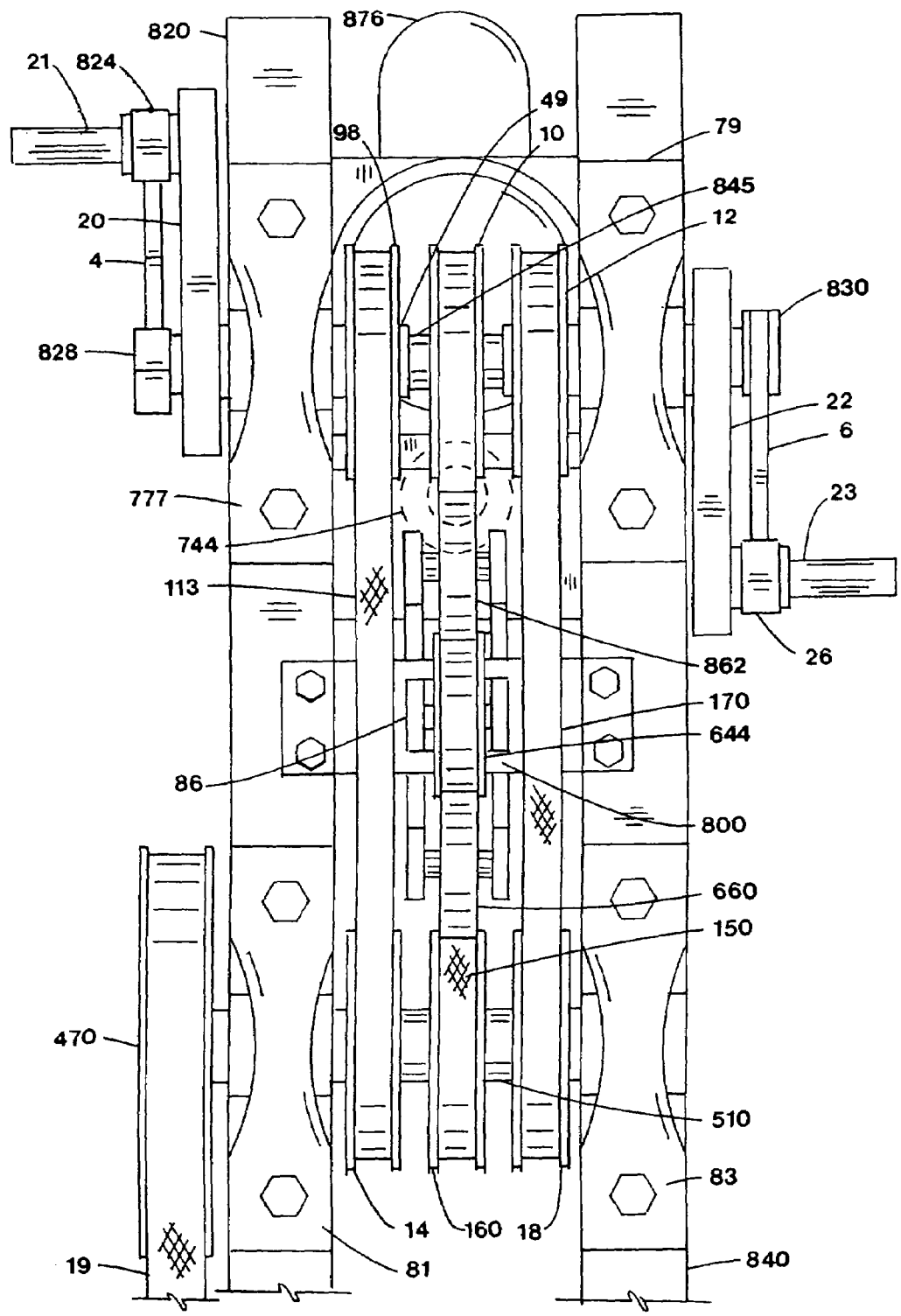
FIG. 4 is a top view of the adjustable crank shown in FIG. 3.

FIGS. 3 and 4 show an adjustable crank assembly that may be used for first crank arms 28,30 or as shown, for the second crank arms 20,22 of the preferred embodiment of FIGS. 1 and 2. Adjustment arms 828,830 are attached generally opposed to adjustment shaft 845 which forms a pivot axis 845. Pivot axis 845 is positioned at axis 43 shown in FIG. 1. Crankshaft 49 is positioned concentric with adjustment shaft 845 and supported by bearings 777,79. Crank arms 20,22 are attached to crankshaft 49 in generally opposing directions. Crank links 824,826 are connected to crank arms 20,22 at pivots 825,827 and have drive pivots 21,23 positioned at the ends. Adjustment links 4,6 are connected to adjustment arms 828,830 at pivots 829,831 and to crank links 824,826 at pivots 841,843.

Crank arms 20,22, crank links 824,826, adjustment arms 828,830 and adjustment links 4,6 combine to form a pair of crank linkages. A rotation of adjustment arms 828,830 relative to crank arms 20,22 cause the predetermined distance between the drive pivots 21,23 to change relative to the pivot axis 845. Pulleys 98,12 are attached to crankshaft 49 which has a missing midsection. Pulley 10 is positioned in the missing midsection and is attached to adjustment shaft 845.

Jackshaft 510 is positioned distal to pivot axis 845 and supported by bearings 81,83. Pulleys 14,160,18 and 470 are attached to jackshaft 510. Pulley 470 replaces pulley 49 of FIG. 1 and is engaged with belt 19. Timing belt 113 engages pulleys 98,14 and timing belt 170 engages pulleys 12,18 causing crank arm 20 to rotate at the same speed as crank arm 22. Timing belt 150 engages pulleys 10,160, idler pulleys 862,660,680,772 and movable pulleys 644,700. Idler pulleys 862,660,680,772 rotate about fixed pivots 61,65,67,71. Movable pulleys 644,700 are connected to slider link 86 at pivots 63,69. Slider link 86 is supported by slide bearing 800 to move back and forth relative to frame members 820,840.

Belts 113,150,170, pulleys 98,10,12,14,160,18,862,644, 660, 680,700,772 and slider link 86 form a belt assembly that can change the angular relationship between adjustment shaft 845 and crankshaft 49. Actuator 876 is attached to frame 820,840 and threaded shaft 75 with threaded nut 744 is connected to slider link 86 at pivot 73. When actuator 876 receives a signal from control system 66 via wires 16,97 to move threaded nut 744, slider link 86 will move causing pulley 10 to rotate relative to pulleys 98,12 which changes the second crank predetermined distance between drive pivots 21,23 and pivot axis 845 along path 92.

Changing the second crank predetermined distance 92 results in a change of stride length in curves 1 and 3 shown in FIG. 1. Adjustment of the predetermined distance occurs with pulley 470 moving or stationary. Bearings 777,79,81,83, slide bearing 800 and actuator 876 are supported by frame members 820,840. Frame members 820,840 are attached to frame members 76,78. If the adjustable crank were to replace the first crank arms 28,30 a change of the first crank predetermined distance would result in both the length and lift being changed in curves 1 and 3. It is understood that an alternate design of an adjustable crank could be used to change the predetermined distance between drive pivots 21,23 and pivot axis 845 and remain within the scope of this invention.

In summary, the present invention has distinct advantages over prior art because the pedals have less articulation than a rear drive cross trainer having a long crank for less ankle stress. Further, the pedal path may be adjusted in length, lift and orientation.

The present invention may be embodied in other specific forms without departing from its spirit or essential characteristics. The described embodiments are to be considered in all respects only as illustrative, and not restrictive. The scope of the invention is, therefore, indicated by the claims, rather than by foregoing description. All changes which come within the meaning and range of equivalency of the claims are to be embraced within their scope.

What is claimed is:

1. An exercise machine comprising;
   a framework, said framework configured to be supported by a support surface;
   a first crank, said first crank rotatably connected to said framework projecting outwardly therefrom on both sides thereof;
   a second crank, said second crank rotatably connected to said framework projecting outwardly therefrom on both sides thereof;
   a pair of orbital links, each said orbital link having a first end and a second end, said first end pivotally connected to said first crank and an intermediate portion of each said orbital link operably associated with said second crank;
   a pair of foot support members, each said foot support member having a first end and a second end, said first end pivotally connected to said second end of a respective said orbital link, such that said first end of said foot support member follows a generally closed loop curve when said cranks are rotated;
   a pair of rollers, each said roller rotatably connected to said foot support member intermediate said ends;
   a pair of guides, each said guide in rollable contact with said roller and operably associated with said framework to cause said roller to have a back and forth movement;
   a pair of pedals to support a user's feet, each said pedal attached to a corresponding said second end of said foot support member;
   said pedals configured to move relative to said framework when the user's feet rotate said cranks whereby said pedals follows an elongate pedal curve.

2. The exercise machine according to claim 1 further comprising a pair of connector links, each said connector link pivotally connected to said second crank and a corresponding said orbital link.

3. The exercise machine according to claim 1 wherein said guide is movable relative to said frame to change said elongate pedal curve.

4. The exercise machine according to claim 1 further comprising a load resistance means operably associated with said cranks.

5. The exercise machine according to claim 1 further comprising arm exercise assembly, said arm exercise assembly operably associated with said cranks.

6. The arm exercise assembly according to claim 5 further comprising a pair of handles, each said handle pivotally connected to said framework and operably associated with said cranks.

7. The exercise machine according to claim 1 further comprising an adjustment device, said adjustment device operably associated with said guides to change the shape of said elongate pedal curve.

8. The exercise machine according to claim 7 further comprising a control system, said control system operably associated with said adjustment device to enable said elongate pedal curve to be changed during operation.

9. An exercise machine comprising;
   a framework, said framework configured to be supported by a support surface;
   a first crank, said first crank rotatably connected to said framework projecting outwardly therefrom on both sides thereof;
   a second crank, said second crank rotatably connected to said framework projecting outwardly therefrom on both sides thereof, wherein the first or second crank is an adjustable crank;
   a pair of foot support members, each said foot support member having a first end and a second end, said first end operably associated with said first crank and said second crank, such that said first end of said foot support member follows a generally closed loop curve when said cranks are rotated;
   a pair of orbital links, each said orbital link pivotally connected to said first crank and to a corresponding first end of said foot support member;
   a pair of connector links, each said connector link pivotally connected to said second crank and a corresponding said orbital link;
   a pair of rollers, each said roller rotatably connected to said foot support member intermediate said ends;
   a pair of guides, each said guide in rollable contact with said roller and operably associated with said framework to cause said roller to have a back and forth movement;
   a pair of pedals to support a user's feet, each said pedal attached to a corresponding said second end of said foot support member;
   said pedals configured to move relative to said framework when the user's feet rotate said cranks whereby said pedals follows an elongate pedal curve.

10. The exercise machine according to claim 9 wherein the adjustable crank has a control system operably associated with said adjustable crank and said framework whereby said control system allows said elongate pedal curve to be changed during operation of said exercise machine.

11. The exercise machine according to claim 9 further comprising a load resistance, said load resistance operably associated with said cranks.

12. The exercise machine according to claim 9 further comprising arm exercise assembly, said arm exercise assembly operably associated with said orbital links.

13. The exercise machine according to claim 9 wherein said guide is movable relative to said frame to change said elongate pedal curve.

14. An exercise machine comprising;
   a framework, said framework configured to be supported by a support surface;
   a first crank, said first crank rotatably connected to said framework projecting outwardly therefrom on both sides thereof;

a second crank, said second crank rotatably connected to said framework projecting outwardly therefrom on both sides thereof, wherein the first or second crank is an adjustable crank;

a pair of foot support members, each said foot support member having a first end and a second end, said first end operably associated with said first crank and said second crank, such that said first end of said foot support member follows a generally closed loop curve when said cranks are rotated;

a pair of rollers, each said roller rotatably connected to said foot support member intermediate said ends;

a pair of guides, each said guide in rollable contact with said roller and operably associated with said framework to cause said roller to have a back and forth movement;

a pair of pedals to support a user's feet, each said pedal attached to a corresponding said second end of said foot support member;

said pedals configured to move relative to said framework when the user's feet rotate said cranks whereby said pedals follows an elongate pedal curve;

the adjustable crank, having a control system operably associated with said cranks and said framework whereby said control system allows said elongate pedal curve to be changed during operation of said exercise machine.

15. The exercise machine according to claim 14 further comprising a pair of orbital links, each said orbital link pivotally connected to said first crank and to a corresponding first end of said foot support member.

16. The exercise machine according to claim 15 further comprising a pair of connector links, each said connector link pivotally connected to said second crank and a corresponding said orbital link.

17. The exercise machine according to claim 14 further comprising an actuator, said actuator operably associated with said adjustable crank and said control system.

18. The exercise machine according to claim 14 wherein said adjustable crank is configured to change both the stride length and height of said elongate pedal curve.

* * * * *